(12) United States Patent
Shimizu

(10) Patent No.: US 11,794,555 B2
(45) Date of Patent: Oct. 24, 2023

(54) HEAT PUMP SYSTEM FOR VEHICLE AIR CONDITIONING DEVICES

(71) Applicant: SANDEN HOLDINGS CORPORATION, Isesaki (JP)

(72) Inventor: Nobutaka Shimizu, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 418 days.

(21) Appl. No.: 17/269,708

(22) PCT Filed: Aug. 23, 2019

(86) PCT No.: PCT/JP2019/032953
§ 371 (c)(1),
(2) Date: Feb. 19, 2021

(87) PCT Pub. No.: WO2020/045261
PCT Pub. Date: Mar. 5, 2020

(65) Prior Publication Data
US 2021/0197648 A1 Jul. 1, 2021

(30) Foreign Application Priority Data
Aug. 30, 2018 (JP) .................................. 2018-161397

(51) Int. Cl.
*B60H 1/22* (2006.01)
*B60H 1/32* (2006.01)
(Continued)

(52) U.S. Cl.
CPC ........... *B60H 1/22* (2013.01); *B60H 1/00007* (2013.01); *B60H 1/00278* (2013.01);
(Continued)

(58) Field of Classification Search
CPC .. B60H 1/22; B60H 1/00007; B60H 1/00278; B60H 1/00328; B60H 1/3228;
(Continued)

(56) References Cited

U.S. PATENT DOCUMENTS 2,047,827 A * 7/1936 Lamb ........................ F25B 5/02
62/226
3,150,498 A * 9/1964 Blake ........................ F25B 1/10
62/81
(Continued)

FOREIGN PATENT DOCUMENTS

CN 105247297 B * 12/2018 ......... B60H 1/00921
EP 1441185 A2 * 7/2004 ................ F25B 1/10
(Continued)

OTHER PUBLICATIONS

International Search Report dated Nov. 19, 2019 Issued in Patent Application No. PCT/JP2019/032953.

*Primary Examiner* — Ljiljana V. Ciric
(74) *Attorney, Agent, or Firm* — Pearne & Gordon LLP

(57) ABSTRACT

A vehicle air-conditioning apparatus heat pump system configured so that an excessive increase in the temperature (superheat degree) of refrigerant discharged from a compressor can be prevented in air-heating operation. The heat pump system (HP) includes a compressor (C) and an indoor heat exchanger (HXC2) on a refrigerant circuit (RC). A first branched flow path (BC1) on which a first expansion mechanism (EX1) with an adjustable opening degree and a first heat absorption heat exchanger (HXA1) are arranged in series and a second branched flow path (BC2) on which a second expansion mechanism (EX2) with an adjustable opening degree and a second heat absorption heat exchanger (HXA2) are arranged in series, where the first branched flow path (BC1) and the second branched flow path (BC2) are (Continued)

arranged in parallel on the refrigerant circuit extending from the indoor heat exchanger to the compressor.

4 Claims, 3 Drawing Sheets

(51) Int. Cl.
*B60H 1/00* (2006.01)
*F25B 49/02* (2006.01)
*F25B 5/02* (2006.01)
*F25B 1/00* (2006.01)
*F25B 27/02* (2006.01)

(52) U.S. Cl.
CPC ..... *B60H 1/00328* (2013.01); *B60H 1/00485* (2013.01); *B60H 1/00907* (2013.01); *B60H 1/00921* (2013.01); *B60H 1/323* (2013.01); *B60H 1/3228* (2019.05); *F25B 1/00* (2013.01); *F25B 5/02* (2013.01); *F25B 49/02* (2013.01); *B60H 2001/00307* (2013.01); *B60H 2001/00928* (2013.01); *B60H 2001/00942* (2013.01); *B60H 2001/3257* (2013.01); *B60H 2001/3285* (2013.01); *F25B 27/02* (2013.01); *F25B 2500/08* (2013.01); *F25B 2600/2513* (2013.01); *F25B 2700/1931* (2013.01); *F25B 2700/1933* (2013.01); *F25B 2700/21151* (2013.01); *F25B 2700/21152* (2013.01)

(58) Field of Classification Search
CPC .......... B60H 1/323; B60H 2001/00307; B60H 1/00485; B60H 1/00907; B60H 1/00921; B60H 2001/00928; B60H 2001/3285; B60H 2001/00942; B60H 2001/3257; F25B 5/02; F25B 49/02; F25B 27/02; F25B 2500/08; F25B 2700/1931; F25B 2700/1933; F25B 2700/21151; F25B 2700/21152; F25B 1/00; F25B 2600/2513
See application file for complete search history.

(56) References Cited

U.S. PATENT DOCUMENTS

| | | | | |
|---|---|---|---|---|
| 3,390,540 A * | 7/1968 | Brush | ............... | F25B 39/02 62/505 |
| 4,760,707 A * | 8/1988 | Dennis | ............... | F25B 5/00 62/197 |
| 5,077,982 A * | 1/1992 | Shaffer, Jr. | ............... | F24F 3/065 62/174 |
| 5,156,014 A * | 10/1992 | Nakamura | ............... | F25B 41/20 62/160 |
| 5,309,733 A * | 5/1994 | Hayashida | ............... | F25B 13/00 62/278 |
| 5,388,422 A * | 2/1995 | Hayashida | ............... | F25B 41/20 62/211 |
| 5,878,589 A * | 3/1999 | Tanaka | ............... | F25B 1/10 165/80.2 |
| 5,878,810 A * | 3/1999 | Saito | ............... | F25B 1/02 62/196.2 |
| 6,321,549 B1 * | 11/2001 | Reason | ............... | B60H 1/3208 62/223 |
| 7,257,964 B2 * | 8/2007 | Song | ............... | F25B 5/02 62/525 |
| 7,360,372 B2 * | 4/2008 | Takechi | ............... | F25B 13/00 62/208 |
| 7,587,909 B2 * | 9/2009 | Yoon | ............... | F25B 13/00 62/324.1 |
| 7,793,511 B2 * | 9/2010 | Yoon | ............... | F25B 13/00 62/208 |
| 8,096,141 B2 * | 1/2012 | VanderZee | ............... | F25B 49/02 62/212 |
| 8,156,750 B2 * | 4/2012 | Butorac | ............... | F25B 49/02 62/205 |
| 8,181,480 B2 * | 5/2012 | Kasahara | ............... | F25B 9/008 62/205 |
| 8,447,432 B2 * | 5/2013 | Lee | ............... | F25D 29/00 700/275 |
| 9,410,727 B1 * | 8/2016 | Boyko | ............... | F25B 41/20 |
| 9,435,549 B2 * | 9/2016 | Yamashita | ............... | F25B 25/005 |
| 9,494,356 B2 * | 11/2016 | Jiang | ............... | F25B 1/10 |
| 9,696,078 B2 * | 7/2017 | Tamaki | ............... | F25B 49/022 |
| 10,775,060 B2 * | 9/2020 | Takenaka | ............... | F25B 41/22 |
| 2006/0048539 A1 * | 3/2006 | Takechi | ............... | F25B 13/00 62/197 |
| 2006/0162358 A1 * | 7/2006 | VanderZee | ............... | F25B 49/02 62/225 |
| 2010/0024455 A1 * | 2/2010 | Butorac | ............... | F25B 49/02 62/515 |
| 2011/0167850 A1 | 7/2011 | Itoh et al. | | |
| 2011/0209485 A1 * | 9/2011 | Lifson | ............... | F25B 49/02 62/115 |
| 2012/0167603 A1 * | 7/2012 | Butorac | ............... | F25B 49/02 62/115 |
| 2015/0059373 A1 * | 3/2015 | Maiello | ............... | F25B 49/022 62/211 |
| 2015/0295285 A1 | 10/2015 | Takeuchi et al. | | |
| 2021/0197648 A1 * | 7/2021 | Shimizu | ............... | B60H 1/00328 |

FOREIGN PATENT DOCUMENTS

| | | | | |
|---|---|---|---|---|
| EP | 1659348 A1 * | 5/2006 | ............... | F25B 13/00 |
| EP | 2407735 A1 * | 1/2012 | ............... | F25B 13/00 |
| JP | 2011-140291 A | 7/2011 | | |
| JP | 2020034228 A * | 3/2020 | ............... | B60H 1/00007 |
| WO | WO-2009039850 A1 * | 4/2009 | ............... | F25B 41/062 |
| WO | WO-2009048466 A1 * | 4/2009 | ............... | F25B 49/02 |
| WO | 2012-137468 A1 | 10/2012 | | |
| WO | 2014-073150 A1 | 5/2014 | | |
| WO | 2014-073151 A1 | 5/2014 | | |
| WO | WO-2014188984 A1 * | 11/2014 | ............... | B60H 1/00921 |
| WO | WO-2018094841 A1 * | 5/2018 | ............... | F25B 13/00 |

* cited by examiner

HEAT PUMP SYSTEM FOR VEHICLE AIR CONDITIONING DEVICES

TECHNICAL FIELD

The present invention relates to a heat pump system used for an air-conditioner (an air-conditioning apparatus) of a vehicle, and specifically relates to a heat pump system configured so that an excessive increase in the temperature (superheat degree) of refrigerant discharged from a compressor as a component of the heat pump system can be prevented.

BACKGROUND ART

As an air-conditioner of a vehicle, one using a heat pump system has been known.

Such a heat pump system includes, on a circuit in which refrigerant circulates, a compressor, vehicle indoor heat exchangers, an expansion mechanism, and a vehicle outdoor heat exchanger. Normally, two vehicle indoor heat exchangers are arranged in series in an air flow direction in an air duct for sending air into a vehicle compartment after air outside or inside the vehicle has been sucked and temperature-adjusted.

In air-cooling operation, high-temperature high-pressure refrigerant discharged from the compressor flows into the vehicle outdoor heat exchanger, and releases heat (i.e., the refrigerant is condensed). Thereafter, the refrigerant flows into the first vehicle indoor heat exchanger (normally arranged on an upstream side in the air duct) through the expansion mechanism, and absorbs heat (i.e., the refrigerant is evaporated). Thereafter, the refrigerant flows back to the compressor. Air sucked into the air duct is cooled into low-temperature air by heat absorption by the refrigerant in the first vehicle indoor heat exchanger, and the low-temperature air is sent into the vehicle compartment.

In air-heating operation, high-temperature high-pressure refrigerant discharged from the compressor flows into the second vehicle indoor heat exchanger (normally arranged on a downstream side in the air duct), and releases heat (i.e., the refrigerant is condensed). Thereafter, the refrigerant flows into the vehicle outdoor heat exchanger through the expansion mechanism, and absorbs heat (i.e., the refrigerant is evaporated). Thereafter, the refrigerant flows back to the compressor. Air sucked into the air duct is heated into high-temperature air by heat absorption from the refrigerant in the second vehicle indoor heat exchanger, and the high-temperature air is sent into the vehicle compartment.

SUMMARY OF THE INVENTION

Problems to be Solved by the Invention

In recent years, it has been proposed that waste heat of the vehicle is utilized as a heat absorption source in the heat pump system used for the air-conditioner of the vehicle, considering effective utilization of energy.

Such a heat pump system is configured such that, e.g., waste heat of a battery mounted on the vehicle is absorbed through coolant water for cooling the battery. Specifically, a chiller (a cooler) is arranged on a circuit in which the coolant water for cooling the battery circulates, and refrigerant having flowed out of the expansion mechanism of the heat pump system is introduced into the chiller. Accordingly, the refrigerant is evaporated by absorbing heat from the coolant water in a high-temperature state due to cooling of the battery, and on the other hand, the coolant water is cooled into low-temperature coolant water by heat absorption by the refrigerant and the low-temperature coolant water flows back to the battery.

In such a heat pump system, heat is absorbed only from the battery coolant water in the chiller under conditions where heat cannot be absorbed from external air (air outside the vehicle) in the vehicle outdoor heat exchanger in the air-heating operation (or conditions where heat absorption is not preferred).

However, when the temperature of the coolant water flowing into the chiller after having cooled the battery increases, the temperature (superheat degree) of heat pump system refrigerant flowing back to the compressor also increases. As a result, the temperature (the superheat degree) of refrigerant discharged from the compressor also increases, and for this reason, the number of rotations of the compressor needs to be decreased or the compressor needs to be stopped such that the temperature does not exceed an upper temperature limit. Thus, operation of the air-conditioner cannot be continued under desired conditions.

The present invention has been made in view of the above-described problems, and is intended to provide a vehicle air-conditioning apparatus heat pump system configured so that an excessive increase in the temperature (superheat degree) of refrigerant discharged from a compressor can be prevented in air-heating operation.

Solution to the Problems

For solving the above-described problems, the vehicle air-conditioning apparatus heat pump system of the present invention is a heat pump system for a vehicle air-conditioning apparatus, the heat pump system including a compressor and an indoor heat exchanger on a refrigerant circuit. A first branched flow path on which a first expansion mechanism of which opening degree is adjustable and a first heat absorption heat exchanger are arranged in series and a second branched flow path on which a second expansion mechanism of which opening degree is adjustable and a second heat absorption heat exchanger are arranged in series are arranged in parallel on the refrigerant circuit extending from the indoor heat exchanger to the compressor. During air-heating operation, the opening degree of the first expansion mechanism is constantly set to higher than zero, and the opening degree of the second expansion mechanism is set to higher than zero only in a case where the superheat degree of refrigerant sucked into the compressor or refrigerant discharged from the compressor reaches equal to or higher than an upper limit or the temperature of refrigerant discharged from the compressor reaches equal to or higher than an upper limit.

Preferably, the first heat absorption heat exchanger is configured to absorb waste heat generated in a vehicle, and the second heat absorption heat exchanger is configured to absorb heat from external air.

Preferably, the first heat absorption heat exchanger is configured to absorb waste heat generated in a battery mounted on the vehicle through coolant water for the battery.

Preferably, the refrigerant superheat degree is calculated using a refrigerant temperature sensor and a refrigerant pressure sensor arranged on an inlet side or an outlet side of the compressor on the refrigerant circuit.

Effects of the Invention

According to the heat pump system of the present invention, an excessive increase in the temperature (superheat degree) of refrigerant discharged from the compressor in air-heating operation can be prevented. As a result, operation of an air-conditioner can be continued under desired conditions without the need for decreasing the number of rotations of the compressor or stopping the compressor.

DESCRIPTION OF THE EMBODIMENTS

Hereinafter, an embodiment of the present invention will be described in detail with reference to the drawings.

Figure 1:
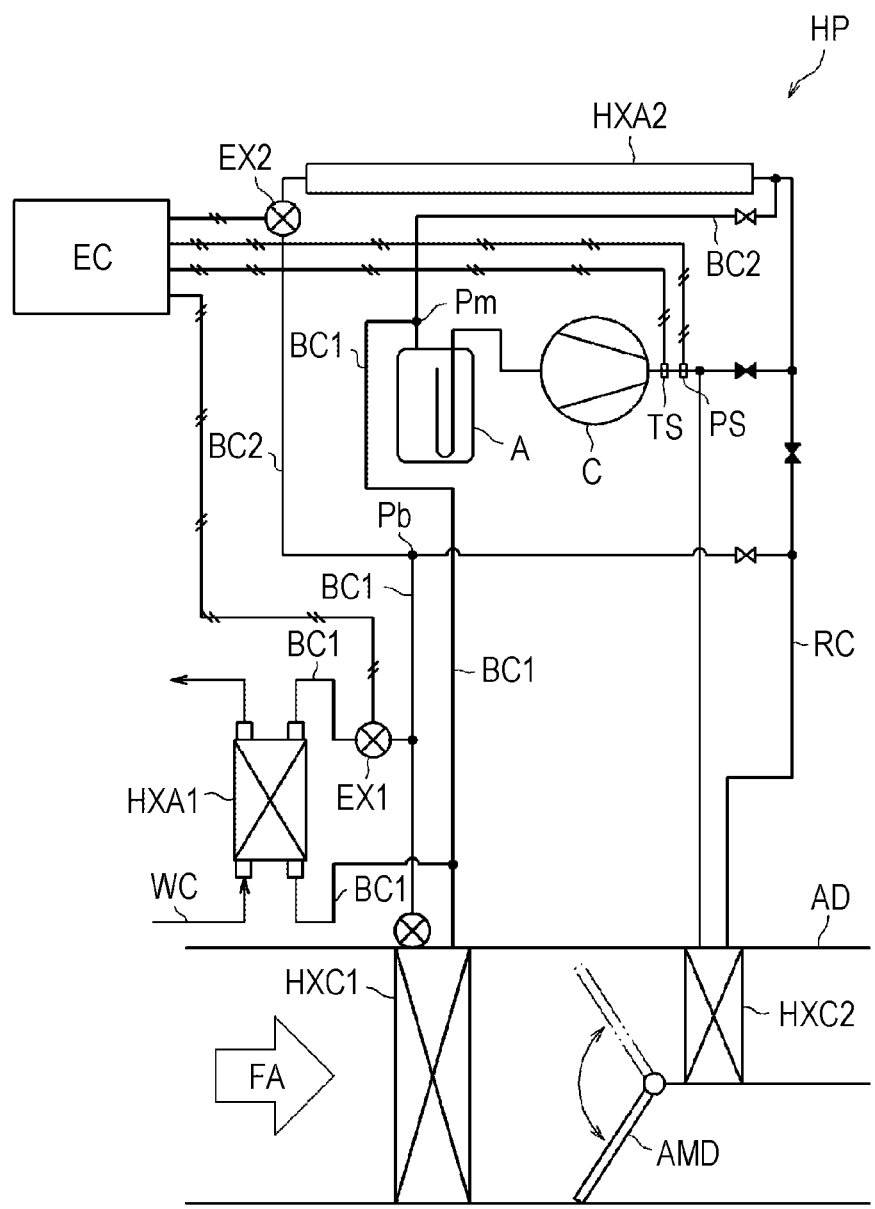
FIG. 1 is a schematic diagram for describing an entire configuration of a heat pump system of an embodiment of the present invention.

FIG. 1 is a schematic diagram for describing an entire configuration of a heat pump system of the embodiment of the present invention.

As illustrated in FIG. 1, the heat pump system HP includes a first indoor heat exchanger HXC1 and a second indoor heat exchanger HXC2 arranged in an air duct AD of an air-conditioner of a vehicle. In the air duct AD, the first indoor heat exchanger HXC1 is arranged on an upstream side of the second indoor heat exchanger HXC2 in an air flow direction indicated by an arrow FA. Moreover, the air duct AD is divided into two paths on a downstream side of the first indoor heat exchanger HXC1, and the second indoor heat exchanger HXC2 is arranged in one of these paths. Further, as indicated by an arrow, an air mix door AMD is turnably attached to an upstream end of a dividing member dividing two paths from each other.

In air-cooling operation, air sucked into the air duct AD from the outside or inside of the vehicle by an air blower fan (not shown) is cooled when passing through the first indoor heat exchanger HXC1, and low-temperature air is sent into a vehicle compartment.

On the other hand, in air-heating operation, air similarly sucked into the air duct AD is heated when passing through the second indoor heat exchanger HXC2, and high-temperature air is sent into the vehicle compartment.

Note that in the case of dehumidifying air in the air-heating operation, air sucked into the air duct AD is cooled when passing through the first indoor heat exchanger HXC1, and contained moisture is condensed and removed. Thereafter, the air is heated when passing through the second indoor heat exchanger HXC2, and as dehumidified high-temperature air, is sent into the vehicle compartment. At this point, a ratio between the air passing through the second indoor heat exchanger HXC2 and air bypassing the second indoor heat exchanger HXC2 in the air having passed through the first indoor heat exchanger HXC1 is adjusted by the air mix door AMD.

The heat pump system HP further includes a compressor C, a first expansion mechanism EX1 and a second expansion mechanism EX2, a first heat absorption heat exchanger HXA1 and a second heat absorption heat exchanger HXA2, and an accumulator A. There types of equipment and the first indoor heat exchanger HXC1 and the second indoor heat exchanger HXC2 as described above are arranged on a refrigerant circuit RC.

The compressor C has the function of compressing low-pressure gas-phase refrigerant to discharge such refrigerant as high-temperature high-pressure superheated gas-phase refrigerant. Note that a refrigerant temperature sensor TS and a refrigerant pressure sensor PS are arranged on an outlet side of the compressor C on the refrigerant circuit RC, and these sensors are electrically connected to an electronic control apparatus EC.

The first expansion mechanism EX1 and the first heat absorption heat exchanger HXA1 are arranged in series on a first branched flow path BC1, and the second expansion mechanism EX2 and the second heat absorption heat exchanger HXA2 are arranged in series on a second branched flow path BC2. The first branched flow path BC1 and the second branched flow path BC2 are arranged in parallel with each other between a branching point Pb and a joint point Pm on the refrigerant circuit RC.

Of two heat absorption heat exchangers, the first heat absorption heat exchanger HXA1 is configured so that refrigerant can absorb heat from coolant water for cooling a battery (not shown) mounted on the vehicle. Thus, a coolant water circuit WC in which the coolant water for the battery circulates is connected to the first heat absorption heat exchanger HXA1. With this configuration, the coolant water having turned into high-temperature coolant water after cooling of the battery flows into the first heat absorption heat exchanger HXA1 through the coolant water circuit WC. The coolant water is cooled by heat absorption by refrigerant, and turns into low-temperature coolant water. Such coolant water flows back to the battery through the coolant water circuit WC. Thus, the first heat absorption heat exchanger HXA1 has the function of cooling the battery, and therefore, can be also referred to as a chiller.

On the other hand, the second heat absorption heat exchanger HXA2 is configured such that refrigerant absorbs heat from external air (air outside the vehicle).

The first expansion mechanism EX1 and the second expansion mechanism EX2 are expansion valves of which opening degrees are continuously adjustable from zero (a fully-closed state) to the maximum opening degree (a fully-open state), and for example, can be electronic expansion valves. Each of the first expansion mechanism EX1 and the second expansion mechanism EX2 is electrically connected to the electronic control apparatus EC, and as described later, the opening degrees thereof are controlled by the electronic control apparatus EC based on output signals from the refrigerant temperature sensor TS and the refrigerant pressure sensor PS.

During the air-heating operation, the electronic control apparatus EC calculates a refrigerant saturation temperature at the pressure of refrigerant measured by the refrigerant pressure sensor PS based on such a pressure, and calculates the superheat degree SH of gas-phase refrigerant discharged from the compressor C by comparison with the temperature of refrigerant measured by the refrigerant temperature sensor TS.

In a case where the calculated superheat degree SH is lower than an upper limit SHUL, a signal corresponding to a predetermined opening degree higher than zero is output to the first expansion mechanism EX1, and a signal corresponding to a zero opening degree (the fully-closed state) is output to the second expansion mechanism EX2.

On the other hand, in a case where the calculated superheat degree SH is equal to or higher than the upper limit SHUL or a case where the temperature (i.e., the temperature TD of refrigerant discharged from the compressor C) of refrigerant measured by the refrigerant temperature sensor TS is equal to or higher than an upper limit TDUL, a signal corresponding to a predetermined opening degree higher than zero is output to the first expansion mechanism EX1, and a signal corresponding to a predetermined opening degree higher than zero is also output to the second expansion mechanism EX2.

In other words, the opening degree of the first expansion mechanism EX1 is constantly set to higher than zero during the air-heating operation, and the opening degree of the second expansion mechanism EX2 is set to higher than zero only in a case where the superheat degree SH of gas-phase refrigerant discharged from the compressor C reaches equal to or higher than the upper limit SHUL or a case where the temperature TD of gas-phase refrigerant discharged from the compressor C reaches equal to or higher than the upper limit TDUL.

With this configuration, in a case where the superheat degree SH of gas-phase refrigerant discharged from the compressor C is lower than the upper limit SHUL, only the first expansion mechanism EX1 is opened, and refrigerant flows only in the first branched flow path BC1. On the other hand, in a case where the superheat degree SH of gas-phase refrigerant discharged from the compressor C is equal to or higher than the upper limit SHUL or a case where the temperature TD of gas-phase refrigerant discharged from the compressor C is equal to or higher than the upper limit TDUL, both of the first expansion mechanism EX1 and the second expansion mechanism EX2 are opened, and refrigerant flows in both of the first branched flow path BC1 and the second branched flow path BC2. Note that in a case where the superheat degree SH which was equal to or higher than the upper limit SHUL falls below the upper limit SHUL or a case where the temperature TD which was equal to or higher than the upper limit TDUL falls below the upper limit TDUL, the second expansion mechanism EX2 is closed, and refrigerant flows only in the first branched flow path BC1 again.

Actuation of the heat pump system HP configured as described above in the air-heating operation will be described below.

Figure 2:
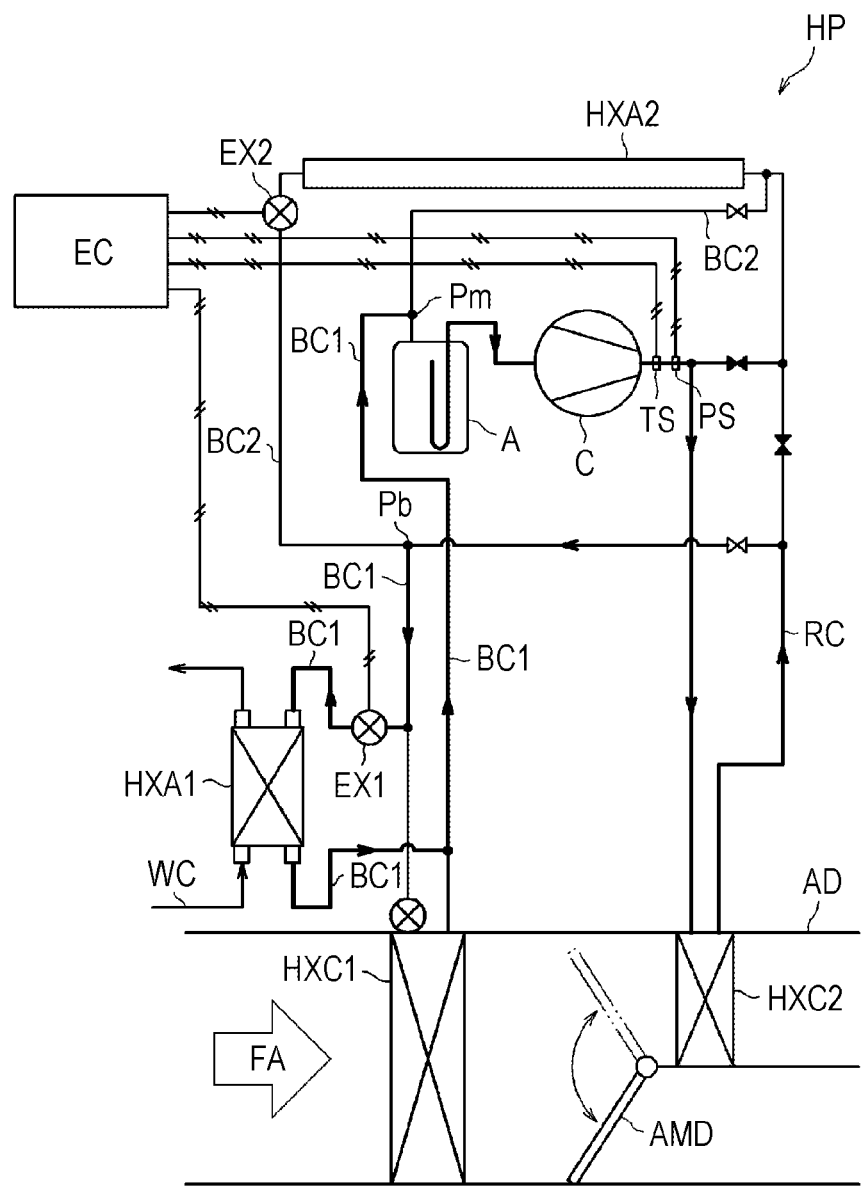
FIG. 2 is a schematic diagram for describing the flow of refrigerant in a case (a normal operation state) where the superheat degree of gas-phase refrigerant discharged from a compressor is lower than an upper limit in air-heating operation of the heat pump system of the embodiment of the present invention.
Figure 3:
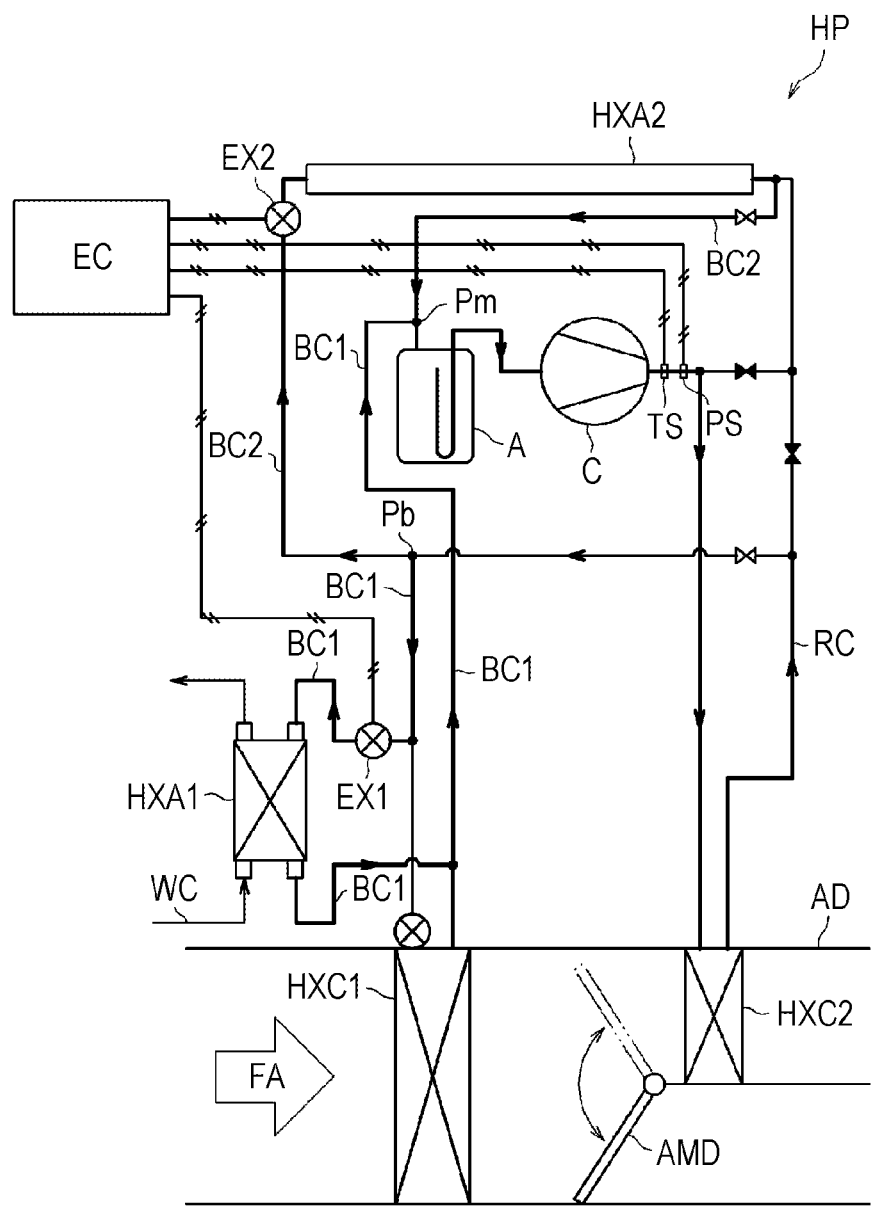
FIG. 3 is a schematic diagram for describing the flow of refrigerant in a case where the superheat degree or temperature of gas-phase refrigerant discharged from the compressor is equal to or higher than the upper limit in the air-heating operation of the heat pump system of the embodiment of the present invention.

FIGS. 2 and 3 are schematic diagrams for describing the flow of refrigerant in the heat pump system HP in the air-heating operation, FIG. 2 illustrating a normal operation state (the superheat degree of gas-phase refrigerant discharged from the compressor is lower than the upper limit) and FIG. 3 illustrating a case where the superheat degree or temperature of gas-phase refrigerant discharged from the compressor is equal to or higher than the upper limit.

High-temperature high-pressure superheated gas-phase refrigerant discharged from the compressor C flows into the second indoor heat exchanger HXC2, and is condensed into high-pressure liquid-phase refrigerant by releasing heat to air flowing in the air duct AD. At this point, the air flowing in the air duct AD is heated by heat absorption from the refrigerant, and turns into high-temperature air. The high-temperature air is sent into the vehicle compartment.

The refrigerant having flowed out of the second indoor heat exchanger HXC2 flows in the refrigerant circuit RC, and reaches the branching point Pb.

In the case of the normal operation state of the heat pump system HP, i.e., a case where the superheat degree SH of gas-phase refrigerant discharged from the compressor C is lower than the upper limit SHUL, only the first expansion mechanism EX1 on the first branched flow path BC1 is opened, and the second expansion mechanism EX2 on the second branched flow path BC2 is closed, as described above.

Thus, the refrigerant having reached the branching point Pb flows into the first branched flow path BC1 as illustrated in FIG. 2, and isenthalpically expands when passing through the first expansion mechanism EX1 and turns into a wet vapor state.

The refrigerant having flowed out of the first expansion mechanism EX1 flows into the first heat absorption heat exchanger HXA1 (the chiller), and is evaporated into low-pressure gas-phase refrigerant by absorbing heat from the battery coolant water flowing in the coolant water circuit WC. The low-pressure gas-phase refrigerant flows into the accumulator A.

In the accumulator A, mixed liquid-phase refrigerant is removed, and only gas-phase refrigerant flows back to the compressor C.

In the normal operation state of the heat pump system HP, the temperature of the battery gradually increases, and the temperature of the coolant water flowing into the first heat absorption heat exchanger HXA1 (the chiller) also gradually increases. As a result, the superheat degree SH of gas-phase refrigerant discharged from the compressor C also gradually increases.

At this point, the electronic control apparatus EC outputs a signal corresponding to a higher opening degree to the first expansion mechanism EX1, and in this manner, the temperature of the refrigerant flowing out of the first expansion mechanism EX1 is decreased and an increase in the superheat degree SH is suppressed. However, the superheat degree SH eventually reaches the upper limit SHUL thereof.

As described above, when the superheat degree SH of gas-phase refrigerant discharged from the compressor C reaches equal to or higher than the upper limit SHUL or the temperature TD of gas-phase refrigerant discharged from the compressor C reaches equal to or higher than the upper limit TDUL, the second expansion mechanism EX2 closed so far is opened as described above, leading to a state in which both of the first expansion mechanism EX1 and the second expansion mechanism EX2 are opened.

Thus, as illustrated in FIG. 3, the refrigerant having reached the branching point Pb flows separately into the first branched flow path BC1 and the second branched flow path BC2 according to the opening degree of each of the first expansion mechanism EX1 and the second expansion mechanism EX2.

The refrigerant having flowed into each branched flow path isenthalpically expands when passing through the first expansion mechanism EX1 and the second expansion mechanism EX2, and turns into the wet vapor state.

The refrigerant having flowed out of the first expansion mechanism EX1 flows into the first heat absorption heat exchanger HXA1 (the chiller), and is evaporated into low-pressure gas-phase refrigerant by absorbing heat from the battery coolant water flowing in the coolant water circuit WC. The low-pressure gas-phase refrigerant flows into the accumulator A.

Similarly, the refrigerant having flowed out of the second expansion mechanism EX2 flows into the second heat absorption heat exchanger HXA2, and is evaporated into low-pressure gas-phase refrigerant by absorbing heat from external air. The low-pressure gas-phase refrigerant flows into the accumulator A.

In the accumulator A, mixed liquid-phase refrigerant is removed, and only gas-phase refrigerant flows back to the compressor C.

As described above, when the superheat degree SH of gas-phase refrigerant discharged from the compressor C reaches the upper limit SHUL or the temperature TD of gas-phase refrigerant discharged from the compressor C reaches the upper limit TDUL, the second heat absorption heat exchanger HXA2 is still in a low-temperature state, and therefore, the temperature of refrigerant flowing into the second branched flow path BC2 through the branching point Pb and reaching the joint point Pm through the second heat absorption heat exchanger HXA2 is lower than the temperature of refrigerant, which is already in a high-temperature state, flowing into the first branched flow path BC1 through the branching point Pb and reaching the joint point Pm through the first heat absorption heat exchanger HXA1.

As described above, refrigerant flowing out of the first branched flow path BC1 (the first heat absorption heat exchanger HXA1) is mixed with refrigerant, of which temperature is lower than that of the refrigerant flowing out of the first branched flow path BC1, flowing out of the second branched flow path BC2 (the second heat absorption heat exchanger HXA2) so that the temperature of refrigerant on the downstream side of the joint point Pm can be decreased. Moreover, an increase in the superheat degree SH or the temperature TD of gas-phase refrigerant discharged from the compressor C can be suppressed, and therefore, the superheat degree SH or the temperature TD can be decreased.

As described above, according to the heat pump system HP of the embodiment of the present invention, an excessive increase (beyond the upper limit SHUL) in the temperature (the superheat degree SH) of refrigerant discharged from the compressor C can be prevented in the air-heating operation. As a result, operation of the air-conditioner can be continued under desired conditions without the need for decreasing the number of rotations of the compressor C or stopping the compressor C.

Note that the example where the refrigerant temperature sensor TS and the refrigerant pressure sensor PS are arranged on the outlet side of the compressor C on the refrigerant circuit RC has been described above, but these sensors may be arranged on an inlet side of the compressor C on the refrigerant circuit RC.

Moreover, the configuration in which the first heat absorption heat exchanger HXA1 absorbs waste heat of the battery mounted on the vehicle through the coolant water for the battery has been described above, but the first heat absorption heat exchanger HXA1 may be configured to absorb other types of waste heat generated in the vehicle.

Further, the example where two heat absorption heat exchangers (the first heat absorption heat exchanger HXA1 absorbing heat from the battery mounted on the vehicle and the second heat absorption heat exchanger HXA2 absorbing heat from external air) are used has been described above, but, e.g., a heat absorption heat exchanger configured to absorb other types of waste heat generated in the vehicle may be further provided and three or more heat absorption heat exchangers may be used.

LIST OF THE REFERENCE NUMERALS

BC1 First Branched Flow Path
BC2 Second Branched Flow Path
C Compressor
EX1 First Expansion Mechanism
EX2 Second Expansion Mechanism
HXA1 First Heat Absorption Heat Exchanger
HXA2 Second Heat Absorption Heat Exchanger
HXC2 Second Indoor Heat Exchanger (Indoor Heat Exchanger)
HP Heat Pump System
RC Refrigerant Circuit

What is claimed is:

1. A vehicle air-conditioning apparatus heat pump system comprising:
a compressor and an indoor heat exchanger on a refrigerant circuit,
wherein a first branched flow path on which a first expansion mechanism with an adjustable opening degree and a first heat absorption heat exchanger are arranged in series, and
a second branched flow path on which a second expansion mechanism with an adjustable opening degree and a second heat absorption heat exchanger are arranged in series,
the first branched flow path and the second branched flow path are arranged in parallel on the refrigerant circuit extending from the indoor heat exchanger to the compressor, and
during air-heating operation,
the opening degree of the first expansion mechanism is constantly set to higher than zero, and
the opening degree of the second expansion mechanism is set to higher than zero only in a case where a superheat degree of refrigerant sucked into the compressor or refrigerant discharged from the compressor reaches equal to or higher than an upper limit or a temperature of refrigerant discharged from the compressor reaches equal to or higher than an upper limit.

2. The vehicle air-conditioning apparatus heat pump system according to claim 1, wherein
the first heat absorption heat exchanger is configured to absorb waste heat generated in a vehicle, and
the second heat absorption heat exchanger is configured to absorb heat from external air.

3. The vehicle air-conditioning apparatus heat pump system according to claim 2, wherein
the first heat absorption heat exchanger is configured to absorb waste heat generated in a battery mounted on the vehicle through coolant water for the battery.

4. The vehicle air-conditioning apparatus heat pump system according to claim 1, wherein
the refrigerant superheat degree is calculated using a refrigerant temperature sensor and a refrigerant pressure sensor arranged on an inlet side or an outlet side of the compressor on the refrigerant circuit.

* * * * *